United States Patent [19]
Höfer et al.

[11] 4,273,387
[45] Jun. 16, 1981

[54] HYDRAULIC BRAKE SYSTEM

[75] Inventors: Gerald Höfer, Weissach-Flacht; Ewald Hübl, Schwieberdingen; Steffen Schneider, Möglingen, all of Fed. Rep. of Germany

[73] Assignee: Robert Bosch GmbH, Stuttgart, Fed. Rep. of Germany

[21] Appl. No.: 65,303

[22] Filed: Aug. 9, 1979

[30] Foreign Application Priority Data

Nov. 7, 1978 [DE] Fed. Rep. of Germany ....... 2848216

[51] Int. Cl.³ .............................................. B60T 13/14
[52] U.S. Cl. ..................................... 303/10; 303/114
[58] Field of Search ...................... 303/10, 11, 114, 2, 303/52; 188/358, 359, 360

[56] References Cited

U.S. PATENT DOCUMENTS 3,794,076  2/1974  Chouings ........................... 303/10 X
3,805,525  4/1974  Kito et al. .......................... 303/10 X
3,942,844  3/1976  Inada et al. ...................... 303/114 X

OTHER PUBLICATIONS

ATZ Automobiltechnische Zeitschrift 7 (1977), No. 11, pp. 499 and 500 by Dr. Geupel, München.

Primary Examiner—Douglas C. Butler
Attorney, Agent, or Firm—Edwin E. Greigg

[57] ABSTRACT

A hydraulic brake system is proposed for motor vehicles which is equipped with a pump element for generating a pressure in the fluid. The pump is continuously driven by the generator of the motor vehicle during the operation of the vehicle and thus continuously supplies fluid against the closing force of an overflow valve. This kind of pressure generation is applicable both in an auxiliary-force brake system as shown in FIG. 1 and in an external-force brake system as shown in FIG. 2.

9 Claims, 2 Drawing Figures

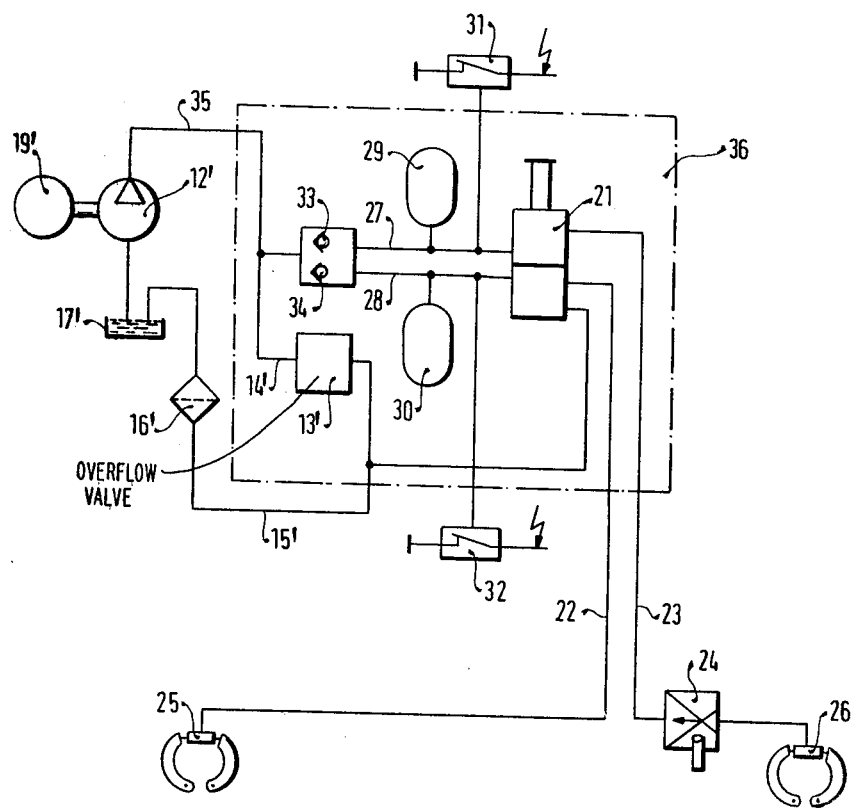

HYDRAULIC BRAKE SYSTEM

BACKGROUND OF THE INVENTION

The invention relates to a brake system of the type described herein and finally claimed. A brake system of this kind is known (ATZ—Automobiltechnische Zeitschrift 79 (1977), Number 11, pages 499 and 500).

A known brake system of this kind has a pump which feeds fluid into a pressure line in which a flow governor is located. Via the flow governor, in case of necessity, a pressure reservoir is filled by throttling the circulation. When the brake pedal is actuated, the energy stored in the reservoir is utilized.

Generally, the brake system is combined with a hydraulic auxiliary-force steering mechanism in the steering gear of which the supply flow of the pump is throttled in case of necessity, in order thus to create a form of boost in the steering function. From the consumers, the fluid then flows back into the reservoir.

If the reservoir is not filled, the fluid supply flow of the pump flows unrestricted from the flow governor of the brake system to the steering mechanism. When the reservoir is being filled, only about 10% of the supply flow of the pump is diverted from the steering to the brake system. The brake thus requires only a small amount of pressure fluid, while the steering operation is a heavy consumer. The pump must therefore be very large, and care must be taken to provide a separate means of carrying off heat therefrom.

In addition, the flow governor in the known system has a switching period; when this is not met, the reservoir is filled, and when it is exceeded, the reservoir filling is set. However, as a result, the reservoir diaphragm, given a relatively high pressure level, is continuously exposed to pressure fluctuations which have an adverse effect on the length of its life.

OBJECT AND SUMMARY OF THE INVENTION

The brake system disclosed herein and finally claimed has the advantage over the prior art that the pressure fluid is required only in small amounts and that it is constantly under pressure and thus immediately available for braking and that the system is very simple in design.

The point of departure of this invention from the known prior art is that a motor vehicle engine requires approximately 1000 watts to drive its generator, and that it is then insignificant whether a further 50 watts, that is, about 5% of the generator drive output, are required for the operation of a pump which is small but runs continuously against pressure.

Because of the negligibly small pressure fluctuations which arise during operation and those which may sometimes appear only during the shut-off and restarting of the engine, the reservoir diaphragm in the brake system, in accordance with the invention, has a very long life.

The pump generates a high energy density of 100–150 bar. As a result, the built-in unit can be made very small and compact. The high system pressures result in a small piston dimension in the pump, so that it can be mounted directly on the generator and can be driven thereby. The high pressure also permits a very small structure insofar as the reservoir is concerned, which will accomplish 10 to 15 reserve braking operations.

The self-sufficient energy source permits the embodiment of the pressure generation with a very simple means of pressure regulation.

The saving in weight by use of the invention disclosed herein is also advantageous; particularly when compared with vacuum boosters with supplementary vacuum pumps, it amounts to only about 30%.

By assembling the system from prefabricated parts, there is considerable flexibility in adapting the system to various vehicles. With the same outside dimensions, the built-in unit can be used both in passenger vehicles and in trucks up to approximately 10 metric tons in weight. Usable boost factors of 2 to 11 are attained, so that a vacuum booster series with a diameter of 8 to 12 inches can be replaced by a built-in unit in accordance with the invention. In the external-force brake system in accordance with the invention, the range from passenger vehicle to 10-ton trucks is served by merely two pump sizes and two reservoir sizes, with an unchanged two-circuit brake valve.

In addition, the desired brake-pedal characteristics can be attained both with the auxiliary force and with the external-force brake system. Such a flexible adjustment is possible particularly in the case of the external-force brake system, in which, of course, the pedal travel and pedal force are simulated. Furthermore, the built-in unit is so designed that a vacuum booster can also be replaced by retrofitting.

Finally, each built-in unit comprises only a few individual elements, and is without vulnerable connecting lines between reservoir and booster or brake valve. As a result, an additional degree of security is provided, and maintenance difficulties are reduced.

The fundamental advantages of a hydraulic system as compared with a vacuum system, such as a shorter response time and independence from underpressure fluctuations such as while driving uphill and downhill, are fully retained.

The invention will be better understood as well as further objects and advantages thereof become more apparent from the ensuing detailed description of preferred embodiments taken in conjunction with the drawings.

BRIEF DESCRIPTION OF THE DRAWINGS

FIG. 2 shows an external-force brake system.

DESCRIPTION OF THE PREFERRED EMBODIMENTS

Figure 1:
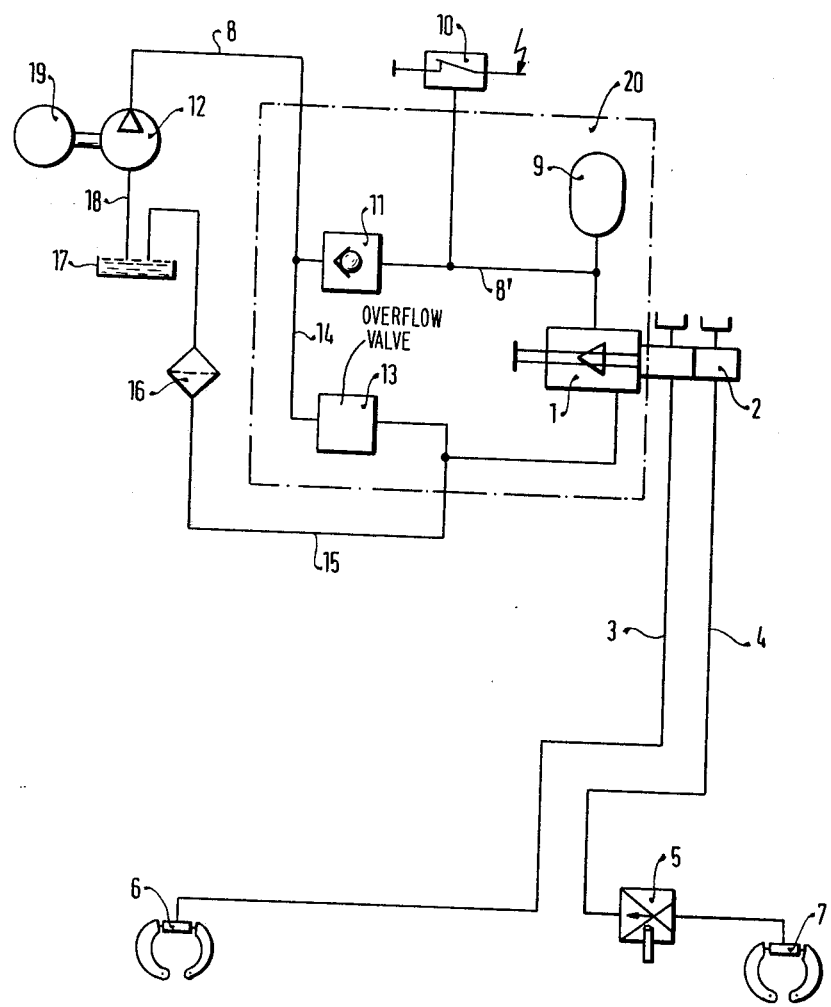
FIG. 1 shows an auxiliary-force brake system.

Turning now to the drawings, the auxiliary-force brake system of FIG. 1 has a brake booster 1 with a subsequent two-circuit tandem main cylinder 2, which via two brake lines 3 and 4, with an interposed load-dependent governor valve 5 as needed, supplies the brake cylinders 6 and 7 of a motor vehicle.

Connected to the brake booster 1 is a pressure line 8, 8', to which a reservoir 9 and a warning switch 10 are connected. In the pressure line 8, 8' there is a check valve 11, through which pressure medium supplied by a pump 12 proceeds to the reservoir 9, the warning switch 10 and the brake booster 1. The level of the pressure in the pressure line 8, 8' is determined by an overflow valve 13, which is disposed at the end of a branch line 14 of the pressure line 8, 8'. A return line 15 begins at the overflow valve 13 and leads through a filter 16 to a tank 17. An intake line 18 of the pump 12 is connected to the tank 17.

The pump 12 is driven by a generator 19, which runs continuously during operation of the motor vehicle. Thus, the pump also operates continuously. Accordingly, the pump generates a pressure in the pressure line 8, 8' whose level is determined by the closing pressure of the overflow valve 13. The pump must continuously supply against this pressure, and this effort requires the application of an output of about 50 watts. The reservoir 9, which assures that the pressure medium is always available and can be utilized by the brake booster 1, thus is also under this pressure. Should there be a pressure drop or a failure of pressure, then the driver of the motor vehicle is informed of the danger by the warning switch 10 and a warning light (not shown).

It is also noted that the brake booster 1, the reservoir 9, the check valve 11 and the overflow valve 13, as indicated in the drawing by dot-dash lines, are combined into a single built-in unit that is indicated as 20. In this manner, the apparatus becomes very compact.

It will be appreciated that the built-in unit 20 can be connected with a conventional two-circuit tandem main cylinder 2, instead of with a vacuum booster. The pedal travel and pedal forces can be adapted to particular requirements within further limits.

In FIG. 2, an external-force brake system is shown, which has a two-circuit brake valve 21, from which two brake lines 22 and 23, with the interposition as needed of a load-dependent governor valve 24, lead to brake cylinders 25 and 26. Two pressure lines 27 and 28 lead to the brake valve 21 and have one pressure reservoir 29 or 30 and one warning switch 31 or 32 disposed on each of them. In each pressure line 27 or 28, there is a check valve 33 or 34. The two check valves 33 and 34 have a common connection to a pressure line 35. The other elements of this system correspond to those of FIG. 1 and are given the same reference numerals, but provided with a prime.

In this embodiment, as well, the level of the pressure in the pressure line 35 and thus in the pressure lines 27 and 28 is determined by the overflow valve 13', which is disposed at the end of the branch line 14' of the pressure line 35.

In this external-force brake system as well, the pump 12' supplies fluid flow continuously against the closing pressure of the overflow valve 13'. The reservoirs 29 and 30, which assure that the pressure medium can be called up by the brake valve 21 at any time, are thus also under this pressure. Should there be a pressure drop or failure of pressure, then the driver is informed of the danger by one of the warning switches 31 or 32.

In this external-force brake system and as described in connection with the two-circuit brake valve 21, the reservoirs 29 and 30, the check valves 33 and 34 and the overflow valves 13' are combined into a single built-in unit 36, as indicated in the drawing by dot-dash lines. In this manner, the apparatus becomes very compact.

The external-force brake system is designed for light and medium-weight trucks or busses; however, it is also applicable in passenger vehicles. To accomplish these various purposes, only the size of the reservoirs 29 and 30 must be adapted to any particular circumstances.

With the brake systems in accordance with the invention, vacuum brake systems of the higher price ranges, that is, those having a separate vacuum pump, can be replaced by a hydraulic system, which can be mounted without great expense on a central hydraulic system; then only the output of the pump needs to be increased and the pressure regulation modified.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A hydraulic brake system including:
    a fluid storage tank;
    a pump connected with said tank and continuously operated during vehicle operation for supplying fluid under pressure in said brake system;
    an overflow valve having a predetermined closing force;
    a first pressure line connected at one end with said pump and at the other end with said overflow valve;
    a return line connected to said overflow valve and said fluid storage tank to return fluid to said fluid storage tank from said overflow valve;
    a second pressure line;
    said second pressure line connected to said first pressure line at a point between said pump and said overflow valve;
    at least one reservoir in communication with said second pressure line;
    whereby said reservoir operates under the pressure predetermined by said overflow valve.

2. A brake system in accordance with claim 1, further wherein said return line begins at said overflow valve.

3. A brake system in accordance with claim 1, further wherein each said reservoir is monitored by a pressure warning switch.

4. A brake system in accordance with claim 1, further wherein said pump is driven by a generator of said motor vehicle.

5. A brake system in accordance with claim 1, further wherein said brake system further includes a brake booster.

6. A brake system in accordance with claim 5, further wherein said brake booster, as well as said reservoir, a check valve and said overflow valve are combined into a single built-in unit.

7. A brake system in accordance with claim 1, further wherein said system includes a two-circuit external-force brake system using a two-circuit brake valve.

8. A brake system in accordance with claim 7, further wherein said system comprises a unitary device including a brake valve, a reservoir, a check valve and an overflow valve.

9. A brake system in accordance with claim 1, wherein:
    said second pressure line includes a check valve for each of said reservoirs communicating with said second pressure line;
    said check valves connected in said second pressure line between said first pressure line and said reservoirs.

* * * * *